United States Patent [19]

Nagano

[11] Patent Number: 5,701,289
[45] Date of Patent: Dec. 23, 1997

[54] OPTICAL HEAD WITH HOLOGRAM COUPLERS FOR READING AND WRITING DATA

[75] Inventor: Tsuyoshi Nagano, Tokyo, Japan

[73] Assignee: NEC Corporation, Japan

[21] Appl. No.: 670,714

[22] Filed: Jun. 21, 1996

[30] Foreign Application Priority Data

Jun. 23, 1995 [JP] Japan ................................. 7-157402

[51] Int. Cl.[6] ................................................ G11B 7/00
[52] U.S. Cl. ................................................ 369/112
[58] Field of Search ................................. 369/109, 110, 369/112, 121, 44.12; 385/14, 15, 31, 33, 39, 129, 130, 131

[56] References Cited

U.S. PATENT DOCUMENTS

| | | | |
|---|---|---|---|
| 4,866,694 | 9/1989 | Korth | 369/44.12 |
| 4,945,525 | 7/1990 | Yamamoto et al. | 369/44.12 |
| 4,971,414 | 11/1990 | Funato et al. | 369/44.12 X |
| 5,070,488 | 12/1991 | Fukushima et al. | 369/110 X |
| 5,105,403 | 4/1992 | Kando et al. | 369/44.12 |
| 5,195,070 | 3/1993 | Shiba et al. | 369/44.12 |
| 5,200,939 | 4/1993 | Nishiwaki et al. | 369/44.12 |
| 5,317,551 | 5/1994 | Shiono | 369/44.12 |
| 5,450,237 | 9/1995 | Yoshida et al. | 369/44.12 X |
| 5,481,386 | 1/1996 | Shimano et al. | 369/44.12 |

FOREIGN PATENT DOCUMENTS

| | | | |
|---|---|---|---|
| 63-53730 | 3/1988 | Japan | G11B 7/135 |
| 2-46536 | 2/1990 | Japan | G11B 7/12 |

OTHER PUBLICATIONS

"High–efficiency blazed grating couplers" Aoyaji et al Applied Physics Letters, vol. 29, No. 5, Sep. 1, 1976, pp. 303–304.

"Integrated–Optic Disc Pickup using Fiber–Linked Light Source" Suhara et al; Department of Electronics, Faculty of Engineering, Osaka University; date unknown (partial translation).

*Primary Examiner*—Paul W. Huber
*Attorney, Agent, or Firm*—Hayes, Soloway, Hennessey, Grossman & Hage, P.C.

[57] ABSTRACT

An optical head includes a beam-generator, a slab type waveguide, an output hologram coupler, a focal lens, an input hologram coupler, and a photoelectric transducer. The slab type waveguide has a cladding, and a first core and a second core formed on opposite side surfaces of the cladding. The output hologram coupler is provided on the slab type waveguide for decoupling a beam emitted from the beam-generator and guided through the second core. The focal lens focuses a beam decoupled in the output coupler and transmitted through the cladding and the first core onto an optical recording medium. The input hologram coupler is provided on the slab type waveguide for coupling to the first core a beam reflected from the optical recording medium and led to the lens. The photoelectric transducer detects the beam coupled to the input coupler and guided through the first core. With this arrangement, it is possible to reduce thickness of the optical head, achieve highly accurate positioning on the slab type waveguide and the photoelectric transducer, and enhance the beam utilization efficiency.

6 Claims, 9 Drawing Sheets

OPTICAL HEAD WITH HOLOGRAM COUPLERS FOR READING AND WRITING DATA

BACKGROUND OF THE INVENTION (1) Field of the Invention

The present invention relates to optical heads for writing data signals in optical recoding media such as optical disks and optical cards, and also to reading recorded signals from such recording media.

(2) Description of the Related Art

A prior art optical head for writing data signals in an optical recording medium and also reading recorded signal therefrom of the kind to which the present invention relates is first explained. This prior art optical head is an optical pickup device disclosed in Japanese Patent Application Kokai Publication No. Hei 2-46536. FIG. 1A is a sectional view showing the pickup device, and FIG. 1B is a plan view showing an optical waveguide of the device.

Referring to FIG. 1A, a laser beam emitted from a semiconductor laser 111 is focused by a condenser lens 113 on an optical disk 114. A reflected beam from the optical disk 114 is transmitted through the condenser lens 113 so as to be incident on an input grating coupler 115 and then coupled to an optical waveguide 116. The beam that has been guided through the optical waveguide 116 is decoupled therefrom by an output grating coupler 117 and is detected by a light-receiving element 118.

As shown in FIG. 1B, beams coupled in regions 115a to 115d of the input grating coupler 115 become respective guided beams 119a to 119d to be decoupled in regions 117a to 117d of the output grating coupler 117.

The light-receiving element 118 shown in FIG. 1A has beam-receiving sections 118a to 118d to detect the beams decoupled in the regions 117a to 117d. The semiconductor laser 111 and light-receiving element 118 are sealed airtight in a package, which comprises a mount 120, a cap 121 and a transparent substrate 112.

By placing a point light source at a beam-emitting point of the semiconductor laser 111 and causing interference between the beam emitted from the point light source and the beam guided through the optical waveguide 116, interference fringes are generated in the optical waveguide 116. The regions 115a and 115d show, in terms of irregularities (concavities or convexities) of a dielectric, the interference fringes between the emitted beam from a point light source which is placed immediately behind the beam-emitting point of the semiconductor laser 111 and the beam guided through the optical waveguide 116. The regions 115b and 115d show, in terms of irregularities of a dielectric, the interference fringes between the emitted beam from a point light source placed immediately ahead of the beam-emitting point of the semiconductor laser 111.

When the optical disk 114 is positioned more remotely from the condenser lens 113 than the focal point of the condenser lens 113, the focal point of the beam reflected by the optical disk 114 is deviated to the front of the beam-emitting point of the semiconductor laser 111, thus increasing the beam coupling efficiency of the regions 115b and 115c. Conversely, when the optical disk 114 becomes closer to the condenser lens 113 than the focal point of the condenser lens 113, the focal point of the reflected beam from the optical disk 114 is deviated toward the rear of the beam-emitting point of the semiconductor laser 111, thus increasing the beam coupling efficiency of the regions 115a and 115d.

This means that a focus error signal in this case is given as $(S118a - S118b - S118c + S118d)$, where $S118a$ to $S118d$ are respectively signals detected at the beam-receiving sections 118a to 118d. Also, a track error signal is given as $(S118a - S118b + S118c - S118d)$.

The beam input to and output from the input grating coupler 115 shown in FIGS. 1A and 1B will now be described with reference to FIGS. 2A to 2D. Referring to FIGS. 2A to 2D, from Snell's law, $$|\alpha_a|\sin\theta_a = |\alpha_b|\sin\theta_b \quad (1)$$

where $\alpha_a$ is the wave vector of the beam emitted from the semiconductor laser 111 and incident on the optical waveguide 116 from the air side, $\theta_a$ is the angle of incidence of that beam, $\alpha_b$ is the wave vector of the beam reflected by the optical disk 114 and incident on the optical waveguide 116 from the side of the transparent substrate 112 shown in FIG. 2A with refractive index n, and $\theta_b$ is the angle of incidence of that beam.

Also, since the beam reflected from the optical disk 114 is coupled to the optical waveguide 116, as shown in FIG. 2B, $$|K| = |\beta| + |\alpha_b|\sin\theta_b \quad (2)$$

where K is the grating vector of the input grating coupler 115, and $\beta$ is the propagation constant vector of the beam guided through the optical waveguide 116. In the equations (1) and (2), the wave vectors $\alpha_a$ and $\alpha_b$ of the beam and the grating vector K are expressed by the following formula.

$$|\alpha_a| = \frac{2\pi}{\lambda}, \quad |\alpha_b| = \frac{2\pi n}{\lambda}, \quad |K| = \frac{2\pi}{\Lambda} \quad \text{Formula 1}$$

where $\lambda$ is the wavelength of light in vacuum, $\pi$ is the circular constant, and $\Lambda$ is the pitch of the input grating coupler 115.

From the equations (1) and (2), $$|K| - |\alpha_a|\sin\theta_a = |\beta| \quad (3a)$$

$$|K| - |\beta| = |\alpha_b|\sin\theta_b \quad (3b)$$

$$|K| - |\beta| = |\alpha_a|\sin\theta_a \quad (3c)$$

Thus, as shown in FIG. 2C, the input grating coupler 115 couples the beam emitted from the semiconductor laser 111 to the optical waveguide 116 and, as shown in FIG. 2D, couples the beam having been guided through the optical waveguide 116 to the side of air and also to the side of the transparent substrate 112.

FIG. 3 schematically shows a different example of the prior art optical head. This optical head is an integrated optical disk pickup using a fiber-linked light source, illustrated on pages 109 through 110 of the paper presented at the Optical Memory Symposium of Jul. 15, 1992, Pacifico Yokohama, Japan.

Referring to FIG. 3, a beam emitted from a semiconductor laser 122 is coupled by an optical fiber 123 to an optical integrated circuit 124. The beam having been guided through the optical integrated circuit 124 is decoupled by a grating coupler 125 therefrom and focused on an optical disk 114. The reflected beam from the optical disk 114 travels in a reverse direction through the incident beam path and is coupled by the grating coupler 125 to the optical integrated circuit 124. The beam having been guided through the optical integrated circuit 124 is split by a twin beam splitter 126 into two beams which are detected at a beam-receiving section 127. A focus error signal and a track error signal are detected by a double knife edge method and a push-pull method, respectively.

The optical integrated circuit 124 is constructed by forming the beam-receiving section 127 with a silicon dioxide buffer layer formed on a silicon substrate, then depositing a waveguide layer of #7059 glass, then forming the grating coupler 125 and the twin beam splitter by forming and patterning an Si-N film, and then depositing a silicon dioxide cover layer.

FIG. 4 schematically shows a further example of the prior art optical head. This optical head uses, for a beam splitter, a grating coupler described in Applied Physics Letters, Vol. 29, No. 5, 1976, pp. 303–304. Here, a beam emitted from a semiconductor laser 128 is directly coupled to an optical waveguide 129. The beam having been guided through the optical waveguide 129, is focused by a condenser lens 130 on an optical disk 114. The beam reflected by the optical disk 114 is coupled by the condenser lens 130 to the optical waveguide 129. The beam having been guided through the optical waveguide 129, is decoupled by a grating coupler 131 therefrom and is detected by a beam-receiving element 132.

The transparent substrate 133 and the optical waveguide 129 are formed using polymethylmethacrylate and nitrocellulose, respectively. The grating coupler 131 is formed by argon ion beam etching.

In the prior art optical head shown in FIGS. 1A and 1B, however, the semiconductor laser 111 and the beam-receiving element 118 are mounted on a mount 120 which faces the transparent substrate 112. Therefore, it is difficult to reduce the thickness of the head. In addition, since the optical waveguide 116 and the beam-receiving element 118 are fixed using the semiconductor laser 111 as a reference, the accuracy of positioning of the optical waveguide 116 and the beam-receiving element 118 relative to each other is inferior.

Moreover in the prior art optical head in FIGS. 1A and 1B, as shown in FIG. 2A, the beam that is directed from the semiconductor laser 111 to the optical disk 114 is partly coupled to the optical waveguide 116. A further problem is that since the beam guided through the optical waveguide 116 is coupled to the air side and also to the side of the transparent substrate 112, a stray beam may be produced which reduces optical utilization efficiency, and results in large amount of noise.

In the prior art optical head shown in FIG. 3, it is impossible to divide the beam reflected from the optical disk 114 into beams guided in different directions respectively. In other words, two-dimensional data contained in the beam is not divided for each data, but is directly compressed into uni-dimensional data. Besides, since the grating coupler 125 deals with both the input and the output, the compression of the data contained in the beam reflected from the optical disk, may result in mixing of the focus error signal and track error signal, in addition to the problems of low optical utilization efficiency and great noise. Furthermore, for making the spatial intensity distribution of the output beam to be a Gaussian distribution, the coupling efficiency is varied continuously, so that it is impossible to obtain sufficient coupling of the input beam.

In the prior art optical head shown in FIG. 4, the grating coupler 131 is not rectangular but in a blaze form. Therefore, the beam guided through the optical waveguide 129 in the +z direction is mostly coupled only to the side of the transparent substrate 133, while the beam propagated in the −z direction is coupled mostly only to the air side. In other words, although the beam reflected by the optical disk 114 is mostly led to the beam-receiving element 132, the beam emitted from the semiconductor laser 128 is mostly not led to the condenser lens 130.

SUMMARY OF THE INVENTION

An object of the invention is to overcome the problems existing in the prior art, and to provide an optical head whose thickness can easily be reduced and which ensures high accuracy of relative positioning of a slab type waveguide and photoelectric converting means.

Another object of the invention is to provide an optical head which has high optical utilization efficiency and is subject to less noise.

A further object of the invention is to provide an optical head, which is free of focus error signal and track error signal mixing.

According to a first aspect of the invention, there is provided an optical head comprising:

a beam-generating means;

a slab type waveguide including a cladding, a first core and a second core, the first and second cores being formed on opposite side surfaces of the cladding;

an output coupler provided on the slab type waveguide for decoupling a beam emitted from the beam-generating means and guided through the second core;

a lens for focusing onto an optical recording medium a beam decoupled in the output coupler and transmitted through the cladding and the first core;

an input coupler provided on the slab type waveguide for coupling to the first core a beam reflected from the optical recording medium and led to the lens; and a photoelectric transducer means for detecting the beam coupled to the input coupler and guided through the first core.

According to a second aspect of the invention, there is provided an optical head comprising:

a beam-generating means;

a slab type waveguide including a first cladding, a second cladding, and a core interposed between the first and second claddings;

a lens for focusing onto an optical recording medium a beam emitted from the beam-generating means and transmitted through the slab type waveguide in the order of the first cladding, the core and the second cladding;

an input coupler provided on the slab type waveguide for coupling to the core a beam reflected from the optical recording medium and led to the lens, the input coupler serving as a volume hologram having a grating vector K simultaneously satisfying relations $$K \neq \alpha_1 - \beta$$

and $$K = \alpha_2 - \beta$$

where $\alpha_1$ is the wave vector of the beam emitted from the beam-generating means and transmitted through the first cladding, $\alpha_2$ is the wave vector reflected from the optical recording medium and transmitted through the second cladding, and $\beta$ is the propagation constant vector of the beam guided through the core; and a photoelectric-transducer means for detecting a beam coupled to the input coupler and guided through the core.

In an optical head according to the invention, an input coupler for coupling a beam reflected from an optical recording medium to a first core, and an output coupler for leading a beam emitted from beam generating means and guided through a second core to the input coupler, are provided separately. It is thus possible to divide the beam reflected by the optical recording medium into beams guided in different directions respectively, that is, two-dimensional data contained in the beam reflected from the optical recording medium, can be divided for each data for compression to uni-dimensional data. As for the input and output, since the input coupler for coupling the beam reflected from the optical recording medium to the first core and the output coupler for leading the beam emitted from the beam generating means and guided through the second core to the input coupler are provided separately, these couplers permit optimization of the coupling efficiency.

An optical head according to the invention, in which an input coupler as shown in FIG. 8A is used, functions as follows. FIGS. 8A to 8D show the beam input to and output from an input coupler 45 in this optical head. Specifically, as shown in FIG. 8A, the slab type waveguide is constituted by a first cladding 42, a first core 43 and a second cladding 44. The grating vector K of the input coupler 45 simultaneously satisfies the following relations.

$$K \neq \alpha_1 - \beta \quad (4)$$

$$K = \alpha_2 - \beta \quad (5)$$

where $\alpha_1$ is the wave vector of the beam emitted from beam emitting means and transmitted through the first cladding 42, $\alpha_2$ is the wave number of the beam reflected from optical recording medium and transmitted through the second cladding 44, and $\beta$ is the propagation constant vector of the beam guided through the first core. The wave vectors $\alpha_1$ and $\alpha_2$ and the grating vector K are expressed by the following formula.

$$|\alpha_1| = \frac{2\pi n_1}{\lambda}, \; |\alpha_2| = \frac{2\pi n_2}{\lambda}, \; |K| = \frac{2\pi}{\Lambda} \quad \text{Formula 2}$$

where $\lambda$ is the wavelength of light in vacuum, $\pi$ is the circular constant, $\Lambda$ is the pitch of the input coupler 45, and $n_1$ and $n_2$ are the refractive indexes of the claddings 51 and 53.

The equation (5) can be re-written as $$\beta = \alpha_2 - K \quad (6)$$

This means that the beam reflected by the optical recording medium is coupled from the side of the second cladding to the core as shown in FIG. 8B.

The equation (4) can be re-written as $$\alpha_1 + K \neq \beta \quad (7)$$

Obviously, the following equations are satisfied.

$$\alpha_1 + K \neq \beta \quad (8)$$

$$\alpha_1 - K \neq \pm \beta \quad (9)$$

Thus, the beam emitted from the beam generating means is not coupled from the side of the first cladding to the core as shown in FIG. 8C. As is obvious from the equation (5), $$\beta \pm K \neq \alpha_2 \quad (10)$$

Also, from the equation (4)

$$\beta + K \neq \alpha_1 \quad (11)$$

Further, obviously $$\beta - K \neq \alpha_1 \quad (12)$$

Thus, the beam guided through the core 43 is coupled neither to the side of the first cladding nor to the side of the second cladding as shown in FIG. 8D.

An optical head according to the invention, in which an output coupler as shown in FIG. 9A is used, functions as follows. FIGS. 9A to 9C show the beam input to and output from an output coupler in this optical head. As shown in FIG. 9A, the output coupler 54 in this optical head is formed as a slab type waveguide having a first cladding 51, a core 52 and a second cladding 53, and transmits or diffracts the beam transmitted from beam generating means and guided through the core 52.

The output coupler 54 simultaneously satisfies the following equations:

$$K \neq \alpha_1 + \beta \quad (13)$$

$$K = \alpha_2 + \beta \quad (14)$$

where $\alpha_1$ is the wave vector of the beam decoupled from the core 52 and transmitted through the first cladding 51, $\alpha_2$ is the wave vector of the beam decoupled from the core 52 and transmitted through the second cladding 53, and $\beta$ is the propagation constant vector of the beam guided from the beam generating means through the core 52 to the optical recording medium. The wave vectors $\alpha_1$ and $\alpha_2$ and the grating vector K are expressed by the formula 2 given above.

The equation (14) can be re-written as $$\alpha_2 = -\beta + K \quad (15)$$

Thus, the beam reflected from the optical recording medium is coupled from the core to the second cladding as shown in FIG. 9B.

As is obvious from the equation (14), $$\beta \pm K \neq \alpha_2 \quad (16)$$

Also, the equation (13) can be re-written as $$\beta - K \neq \alpha_1 \quad (17)$$

Also, obviously the following equation is satisfied.

$$\beta + K \neq \alpha_1 \qquad (18)$$

Thus, the beam propagated from the beam generating means through the core to the optical recording medium is coupled neither to the side of the first cladding nor to the side of the second cladding as shown in FIG. 9C. Further, from the equation (14)

$$-\beta + K \neq \alpha_1 \qquad (19)$$

And obviously $$-\beta - K \neq -\alpha_1 \qquad (20)$$

Thus, the beam propagated from the optical recording medium to the beam generating means through the core 52 is not coupled to the side of the first cladding as shown in FIG. 9B.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are described with reference to the drawings.

Figure 1A:
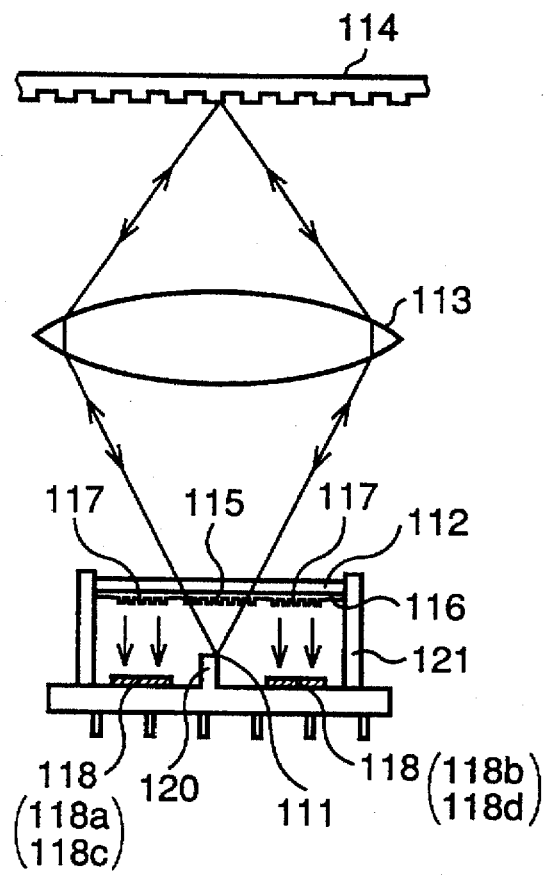
FIGS. 1A and 1B are schematic views showing a prior art optical head.
Figure 1B:
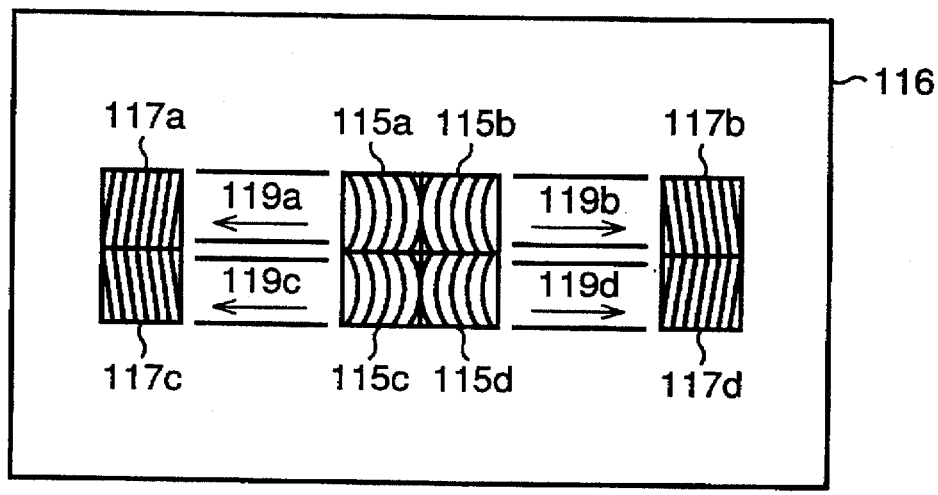
Figure 2A:
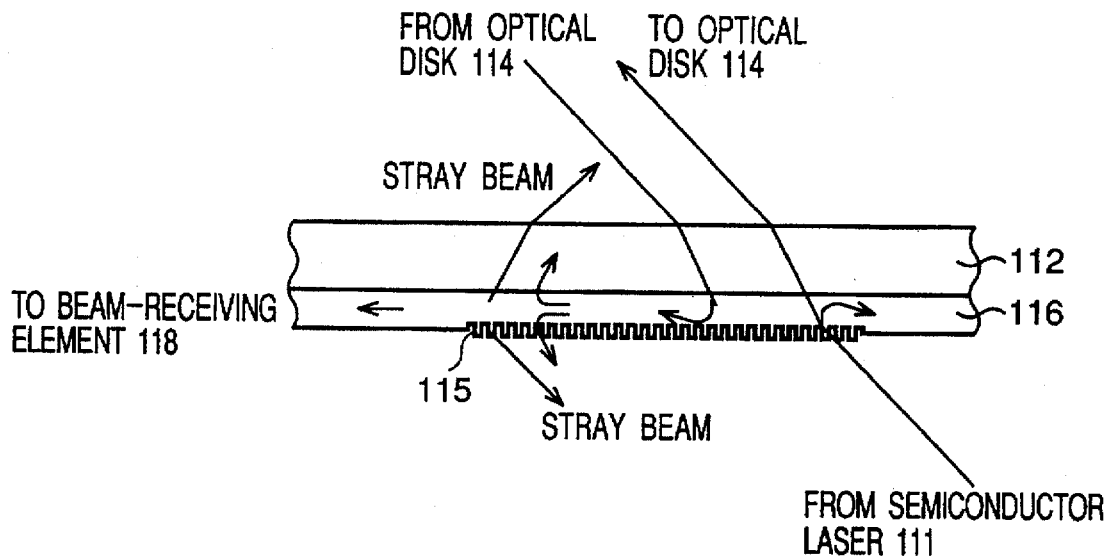
FIGS. 2A, 2B, 2C and 2D are views for describing the beam input to and output from an input grating coupler shown in FIGS. 1A and 1B.
Figure 2B:
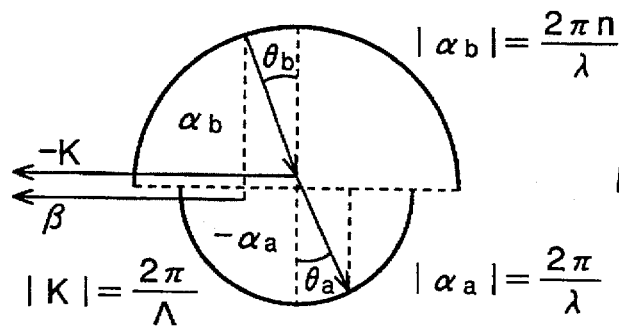
Figure 2C:
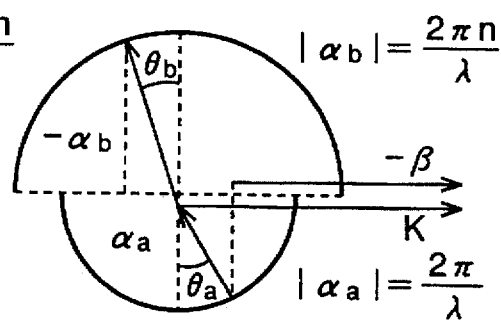
Figure 2D:
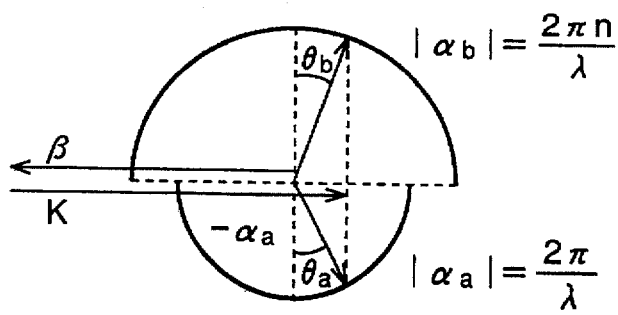
Figure 3:
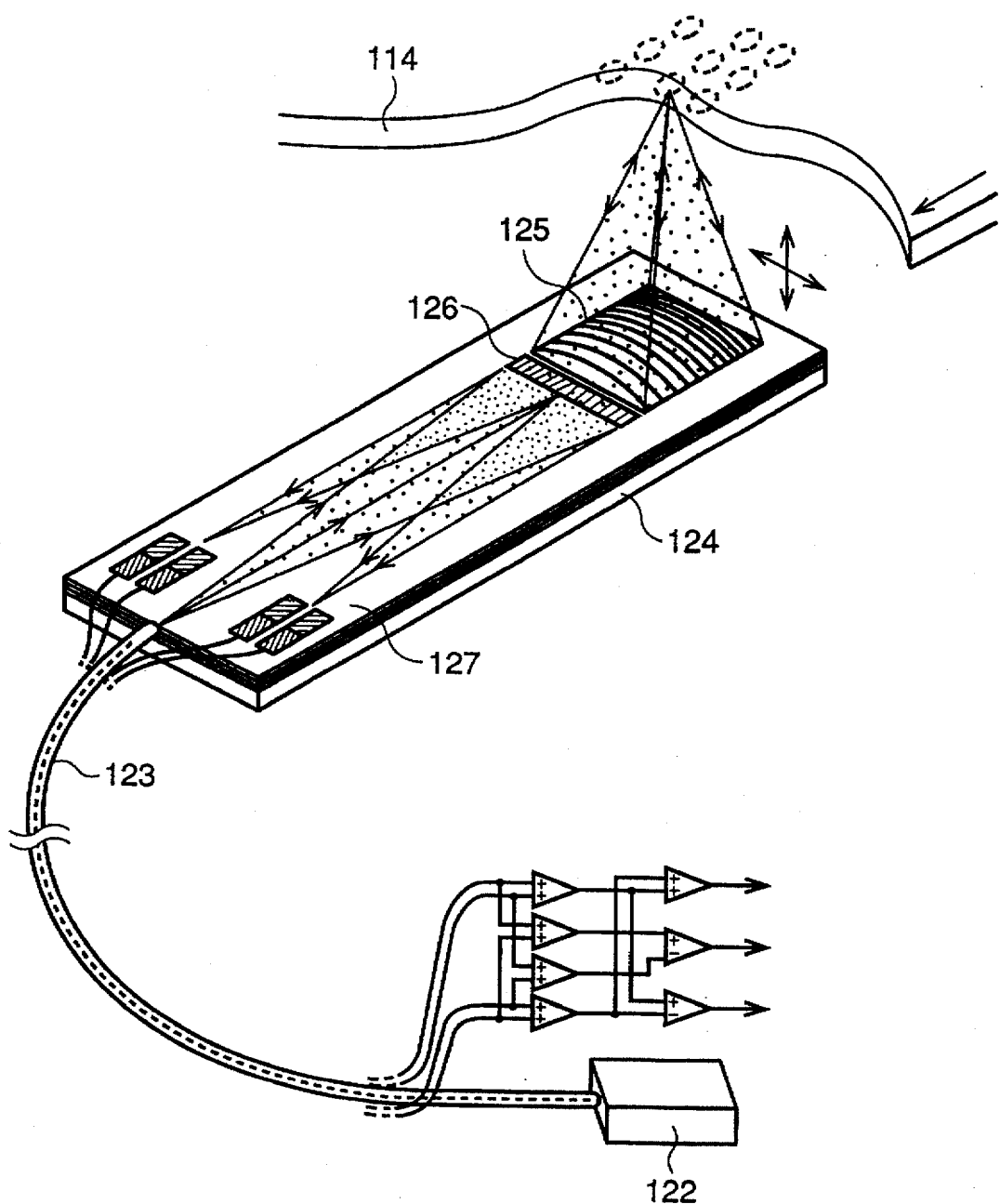
FIG. 3 is a schematic view showing a different prior art optical head.
Figure 4:
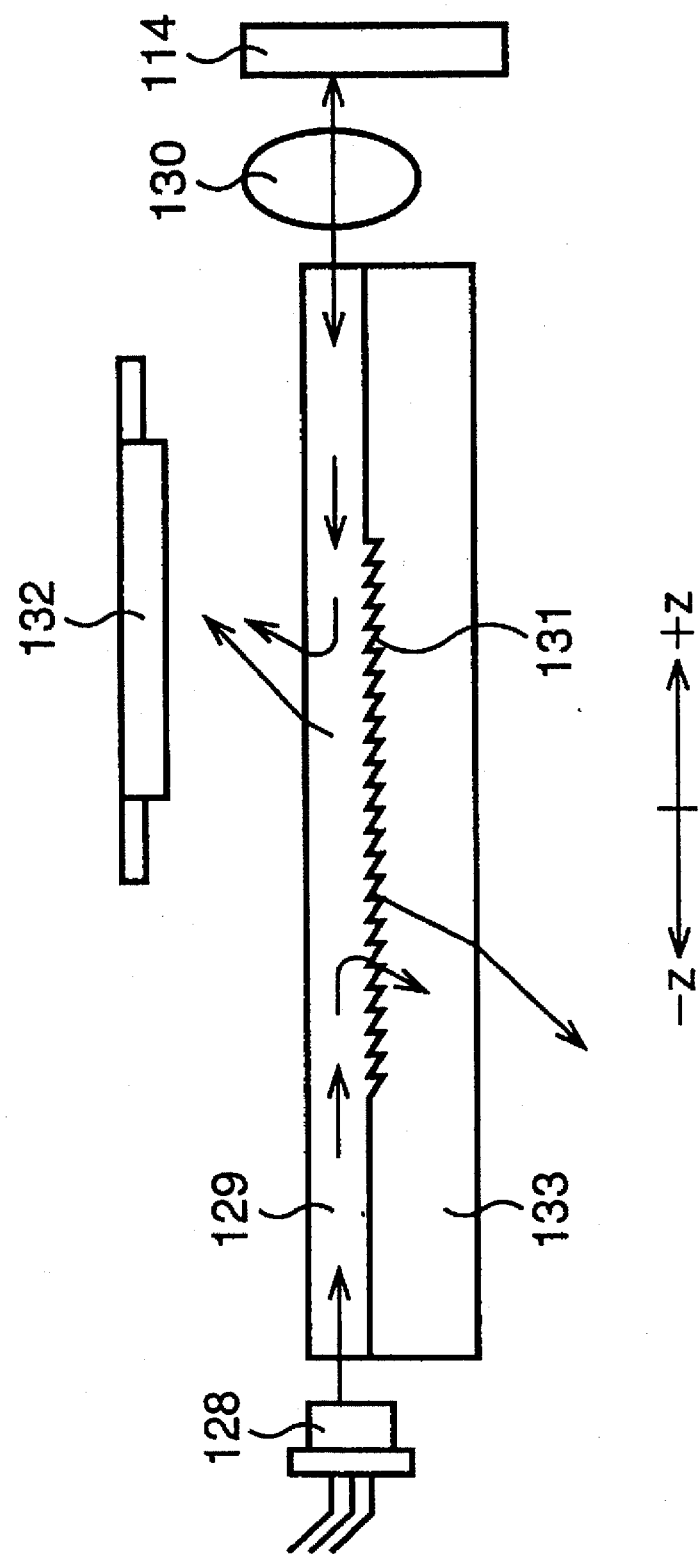
FIG. 4 is a schematic view showing a further prior art optical head.
Figure 5A:
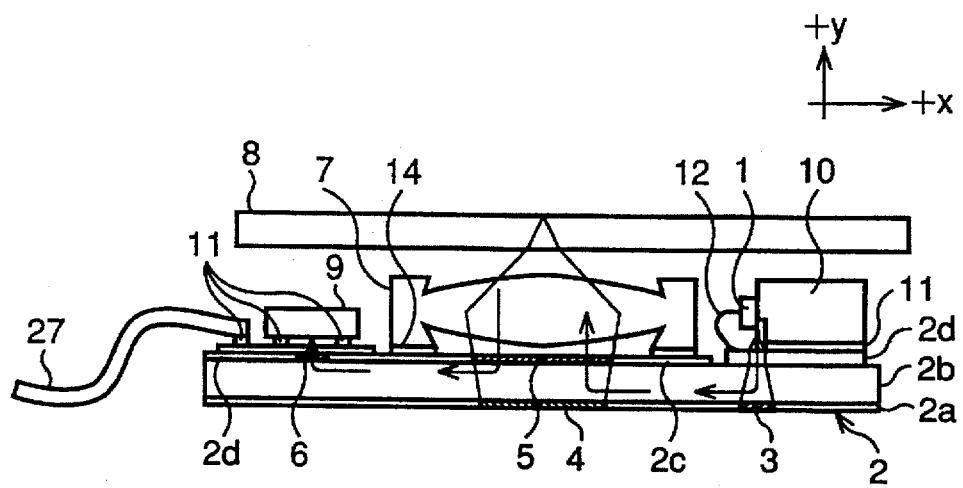
FIGS. 5A, 5B and 5C are schematic views showing an optical head according to a first embodiment of the invention.
Figure 5B:
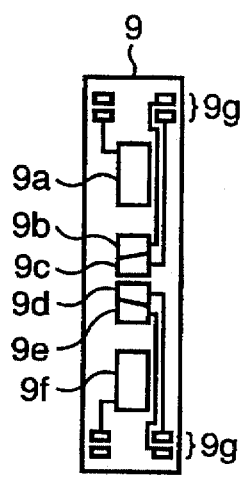
Figure 5C:
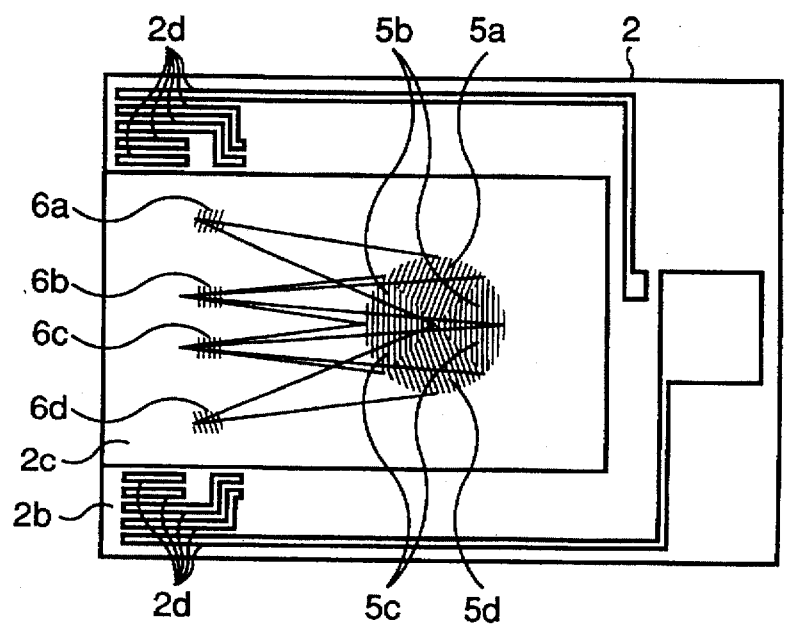

FIGS. 5A to 5C schematically show an optical head according to a first embodiment of the invention. FIG. 5A is a sectional view showing the optical head. FIG. 5B is a plan view showing a photo-diode 9. FIG. 5C is a plan view showing a slab type waveguide 2. As shown in FIG. 5A, this embodiment comprises a laser diode 1 as beam-generating means, a slab type waveguide 2, input hologram couplers 3 and 5, output hologram couplers 4 and 6, a focal points lens 7 (a lens having focal points respectively at the image point side and the object point side) 7 for converging the beam on an optical disk 8 as an example of optical recording medium, and a photo-diode 9 for receiving and photoelectrically converting reflected beam.

The input hologram coupler 5 is an input coupler formed in a slab type waveguide including a cladding 2b, a core 2c and an air layer between the core 2c and the focal points lens 7 as a cladding. The output hologram coupler 4 is an output coupler for directing a beam from the laser diode 1 to the input hologram coupler 5.

The slab type waveguide 2 is fabricated in a process comprising a first step of lithographically forming a photo-resist pattern on one surface of the cladding 2b, which is a synthetic quartz plate optically polished on both surfaces, and depositing titanium, platinum and gold, a second step of lift-off forming interconnects 2d, a third step of forming cores 2a and 2c on both surfaces of the cladding 2b by depositing chalcogenide while shielding the interconnects 2d with a shield, and a fourth step of forming the input hologram couplers 3 and 5 and output hologram couplers 4 and 6 by obtaining an interference fringe with a computer and writing it by an electron beam on the cores 2a and 2c.

The optical head using the slab type waveguide 2 of this embodiment is fabricated by bonding the laser diode 1 having been fixed by solder to a heat sink 10 and the interconnects 2d to one another with a conductive adhesive 11, connecting the laser diode 1 and the interconnects 2d to one another with bonding wires 12, bonding electrodes 9g of the photo-diode 9 and the interconnects 2d to one another with a conductive adhesive 11 (in the form of flip-chip-bonding as shown in FIG. 5A), bonding the interconnects 2d and a flexible substrate 27 to one another with a conductive adhesive 11, and bonding the focal points lens 7 and the core 2c to each other with an ultraviolet-setting resin 14.

With this structure, because of the interconnects 2d with the electrodes 9g directly bonded thereto, highly accurate positioning of the slab type waveguide 2 and photo-diode 9 relative to each other can be realized. In addition, mounting of the laser diode 1 and the focal points lens 7 permits a thin optical head to be realized.

As shown in the plan view of FIG. 5C, the input and output hologram couplers 5 and 6 are formed on the core 2c of the slab type waveguide 2. The input hologram coupler 5 has regions 5a to 5d, and the output hologram coupler 6 has regions 6a to 6d.

As shown in the plan view of FIG. 5B, the photo-diode 9 has, at opposite ends, photoelectric transducers 9a and 9f and intermediate photoelectric transducers 9b to 9e disposed therebetween, the electrodes 9g being connected to the intermediate photoelectric transducers 9b to 9e. A beam coupled to the core 2c in the region 5a is decoupled in the region 6a and detected at the photoelectric transducer 9a of the photo-diode 9, and beams coupled in the regions 5b to 5d are decoupled in the regions 6b to 6d and detected at the photoelectric transducers 9b and 9c, 9d and 9e, and 9f, respectively.

The operation of this embodiment will now be described. The beam emitted from the laser diode 1 in FIG. 5A is transmitted through the cladding 2b and is coupled to the core 2a in the input hologram coupler 3. More specifically, the input hologram coupler 3 is such that an interference fringe generated on the core 2a by the beam emitted from the laser diode 1 and the beam guided through the core 2a in the −x direction (i.e., to the left in FIG. 5A), is recorded as a volume hologram on the core 2a. When the beam emitted from the laser diode 1 is incident, the input hologram coupler 3 reproduces a beam which is guided through the core 2a in the −x direction.

The beam that has been guided through the core 2a in this way, is decoupled in the output hologram coupler 4. The output hologram coupler 4 is such that an interference fringe generated on the core 2a by the beam guided through the core 2a in the −x direction and the beam scattered from the object point of the focal points lens 7, is recorded as a volume hologram on the core 2a. When the beam guided through the core 2a in the −x direction is incident, the output hologram coupler 4 reproduces a beam traveling in the same direction as the beam scattered from the object point of the focal points lens 7. In the output hologram coupler 4, the coupling efficiency is increased in the −x direction through modulation of the refractive index change duty, and the spatial intensity distribution of the output beam is made to be a Gaussian distribution.

The beam that is reproduced from the output hologram coupler 4, is transmitted through the cladding 2b and the core 2c and then is converted by the focal points lens 7 on the optical disk 8 for reflection therefrom. The beam reflected from the optical disk 8 travels in a reverse direction through the beam incidence path and is coupled to the core 2c in the input hologram coupler 5.

The input hologram coupler 5 is such that an interference fringe generated on the core 2c by the beam focused on the object point of the focal points lens 7 and the beam propagated through the core 2c in the −x direction, is recorded as a volume hologram on the core 2c. When the beam focused on the object point of the focal points lens 7 is incident, the input hologram coupler 5 reproduces the beam guided through the core 2c in the −x direction.

The reproduced beam that has been guided through the core 2c and reflected from the optical disk 8 in the above way, is decoupled in the output hologram coupler 6. This is so because the output hologram coupler 6 is such that an interference fringe generated on the core 2c by the beam guided through the core 2c in the −x direction and the collimated beam traveling in the +y direction, is recorded as a volume hologram on the core 2c; and when the beam guided through the core 2c in the −x direction is incident, the output hologram coupler 6 reproduces the collimated beam traveling in the +y direction.

The beam decoupled in the output hologram coupler 6 and reflected from the optical disk 8, is incident on the photodiode 9. The photo-diode 9 converts the incident beam into an electric signal, which is supplied via the electrodes 9g shown in FIG. 5B and also the interconnects 2d provided on the cladding 2b as shown in FIG. 5C and also through the flexible substrate 27 to an electric circuit (not shown) to the focus error signal and track error signal explained later.

The beam that has been reflected from the optical disk 8 and coupled to the core 2c in the region 5a of the input hologram coupler 5 as shown in FIG. 5C, is decoupled in the region 6a of the output hologram coupler 6 to be detected at the photoelectric transducer 9a of the photo-diode 9. Likewise, the beams that are coupled in the regions 5b to 5d of the input hologram coupler 5, are separately decoupled in the regions 6b to 6d of the output hologram coupler 6 to be detected at the photoelectric transducers 9b and 9c, 9d and 9e, and 9f, respectively.

The photo-diode 9 is provided such that, when the optical disk 8 is at the focal point of the focal points lens 7, the reflected beam from the optical disk 8 is focused on a line of division between the photoelectric transducers 9b and 9c and also on a line of division between the photoelectric transducers 9d and 9e. Thus, by denoting the electric signals obtained through photoelectric conversion in the photoelectric transducers 9a to 9f by S9a to S9f, the focus error signal is given as (S9b−S9c−S9d +S9e), and the track error signal is given as (S9a−S9f).

In the input hologram coupler 5 in this embodiment, the regions 5b and 5c which are used for detecting the focus error signal and the regions 5a and 5d used for the track error signal detection, are separate from one another, and thus the focus error signal and the track error signal are not mixed. In addition, in the input hologram coupler 5, the refractive index change duty is fixed, thus providing uniformly high beam coupling efficiency and permitting the coupling of almost the entire input beam.

The input hologram coupler 5 in this embodiment has a further feature that since the refractive index of the cladding 2b is different from that of air, it does not reproduce any beam guided through the core 2c in the +x direction when beam scattered from the objective point of the focal points lens 7 is incident. The input hologram coupler 5 has a yet further feature that, since the volume hologram is recorded, the beam guided through the core 2c in the −x direction leaks to neither the side of the cladding 2d nor the air side.

Figure 6A:
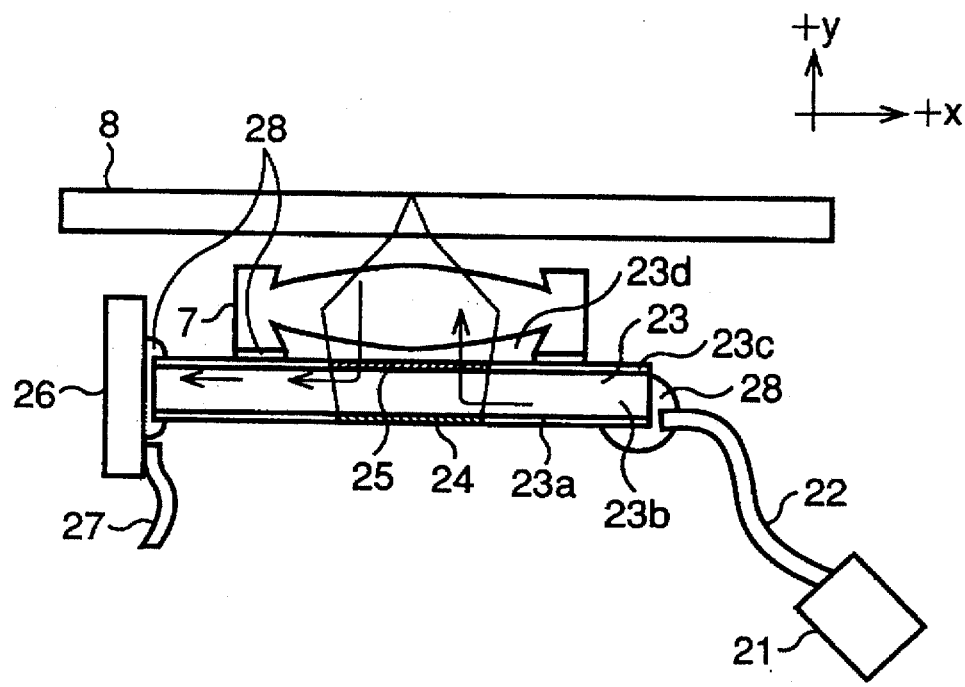
FIGS. 6A, 6B and 6C are schematic views showing an optical head according to a second embodiment of the invention.
Figure 6B:
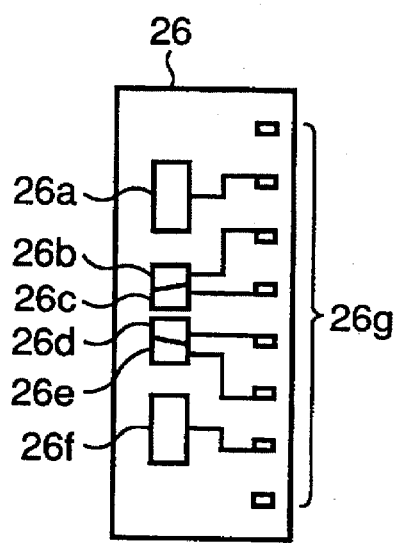
Figure 6C:
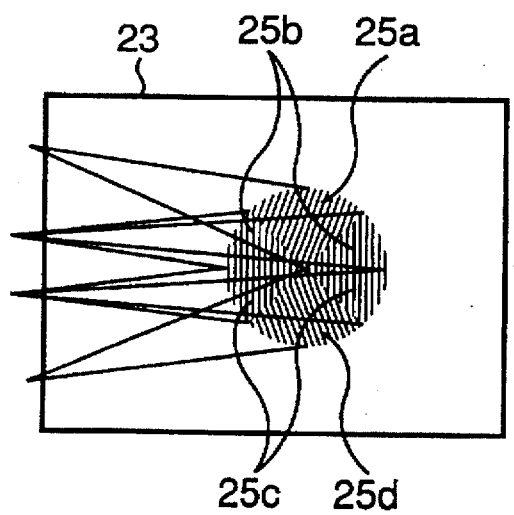

An optical head according to a second embodiment of the invention will now be described. FIGS. 6A to 6C schematically show the second embodiment of the optical head. In the Figures, parts like those in FIGS. 5A to 5C are designated by like reference numerals and symbols, while omitting their description. FIG. 6A is a sectional view showing the optical head. FIG. 6B is a plan view showing a photo-diode. FIG. 6C is a plan view showing a slab type waveguide. As shown in FIG. 6A, this embodiment comprises a laser diode 21 as beam-generating means, a slab type waveguide 23, an output hologram coupler 24, an input hologram coupler 25, a focal points lens 7, and a photo-diode 26 for receiving and photoelectrically converting reflected beam.

The input hologram coupler 25 is an input coupler formed as a slab type waveguide having a cladding 23b corresponding to the first cladding noted earlier, a core 23c corresponding to the first core, and an air layer 23d formed between the core 23c and the focal points lens 7 and corresponding to the second cladding. The output hologram coupler 24 is an output coupler for directing the beam from the laser diode 21 to the input hologram coupler 25.

The slab type waveguide 23 is fabricated in a process comprising a first step of forming cores 23a and 23c on the opposite surfaces of the cladding 23b, which is a synthetic quartz plate optically polished on the opposite surfaces, by depositing charcogenide, and a second step of forming the output hologram coupler 24 and input hologram coupler 25 by obtaining interference fringe with a computer and writing it by an electron beam on the cores 23a and 23c.

The optical head of the second embodiment using this slab type waveguide 23, is fabricated by bonding the focal points lens 7 to the slab type waveguide 23 with an ultraviolet-setting resin 28, and bonding the photo-diode 26 with a flexible substrate 27 mounted thereon and an optical fiber 22 with the laser diode 21 mounted thereon to each other with an ultraviolet-setting resin 28.

The core 23c of the slab type waveguide 23 has an input hologram coupler 25 formed on it. As shown in the plan view of FIG. 6C, the input hologram coupler 25 has regions 25a to 25d. The photo-diode 26, as shown in the plan view of FIG. 6B has, at its two opposite ends, photoelectric transducers 26a and 26f and intermediate photoelectric transducers 26b to 26e disposed therebetween. It further has electrodes 26g.

The beam coupled to the core 23c in the region 25a is detected at the photoelectric transducer 26a in the photo-diode 26, and the beams coupled in the regions 25b to 25d are detected at the photoelectric transducers 26b and 26c, 26d and 25e, and 25f, respectively.

The operation of this embodiment will now be described. Referring to FIG. 6A, the beam emitted from the laser diode 21 is coupled through the optical fiber 22 to the core 23a, and the beam guided through the core 23a is decoupled in the output hologram coupler 24.

The output hologram coupler 24 is such that an interference fringe generated on the core 23a by the beam guided through the core 23a in the −x direction (i.e., to the left in FIG. 6A) and the beam scattered from the object point of the focal points lens 7, is recorded as a volume hologram on the core 23a. When the beam guided through the core 23a in the −x direction is incident, the output hologram coupler 24 reproduces a beam which travels in the same direction as the beam scattered from the object point of the focal points lens 7. The output hologram coupler 24 increases the coupling efficiency in the −x direction by modulating the refractive index change duty, thus uniformalizing the spatial intensity distribution of the output beam.

The beam emitted from the laser diode 21 and decoupled by the output hologram coupler 24 in this way, is transmitted through the cladding 23b and the core 23c to be focused by the focal points lens 7 on the optical disk 8 so as to be reflected therefrom.

The beam reflected from the optical disk 8 travels in a reverse direction through the above beam incidence path and is coupled to the core 23c in the input hologram coupler 25. The input hologram coupler 25 is such that an interference fringe generated on the core 23c by the beam focused on the object point of the focal points lens 7 and the beam guided through the core 23c in the −x direction is recorded as a volume hologram on the core 23c. When the beam focused on the object point of the focal points lens 7 is incident, the input hologram coupler 25 reproduces a beam which is guided through the core 23c in the −x direction.

The beam having been guided through the core 23c in the input hologram coupler 25 in the above way, is directly received and photoelectrically converted by the photo-diode 26. The signal obtained through the photoelectric conversion in the photo-diode 26 is coupled through a flexible substrate 27 to an electric circuit (not shown).

The photo-diode 26 is provided such that the beam reflected from the optical disk 8 is focused on a line of division between the photoelectric transducers 26b and 26c and also on a line of division between the photoelectric transducers 26d and 26e as shown in FIG. 6B. Thus, denoting the electric signals obtained through the photoelectric conversion in the photoelectric transducers 26a to 26f by S26a to S26f, the focus error signal is given as (S26b−S26c−S26d+S26e), and the track error signal is given as (S26a−S26f).

In the input hologram coupler 25 of this embodiment, the regions 25b and 25c used for detecting the focus error signal and the regions 25a and 25d used for detecting the track error signal, are distinct from one another, and thus the focus error signal and the track error signal are not mixed. In addition, in the input hologram coupler 25 the refractive index change duty is fixed, thus providing uniformly high beam coupling efficiency and permitting the coupling of almost the entire input beam.

The embodiment further features that since the refractive index of the cladding 23b is different from that of air, it does not reproduce the beam guided through the core 23c in the +x direction when a beam scattered from the object point of the focal points lens 7 is incident. A yet further feature is that since the volume hologram is recorded, the beam guided through the core 23c in the −x direction leaks to neither the side of the cladding 23b nor the air side.

Figure 7A:
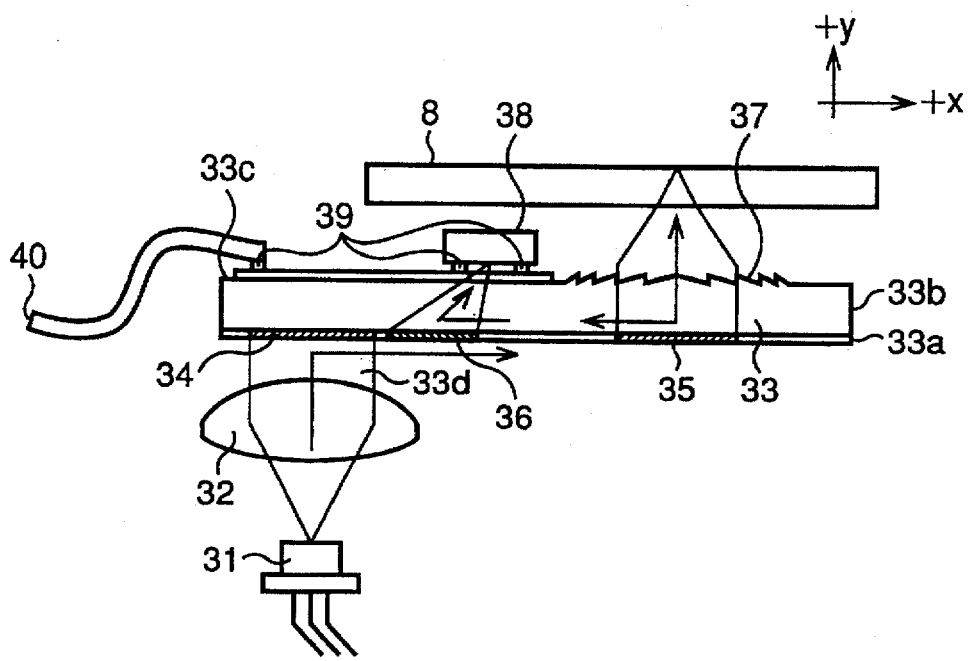
FIGS. 7A, 7B and 7C are schematic views showing an optical head according to a third embodiment of the invention.
Figure 7B:
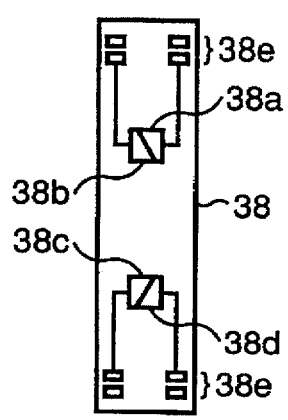
Figure 7C:
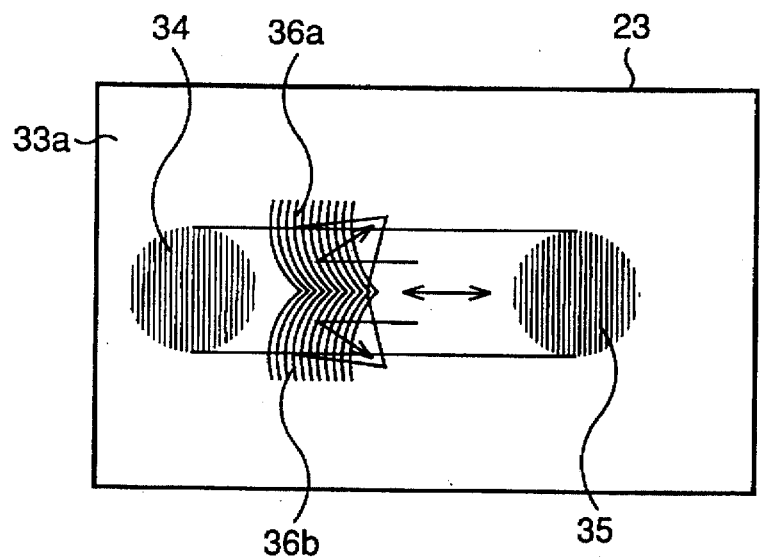
Figure 8A:
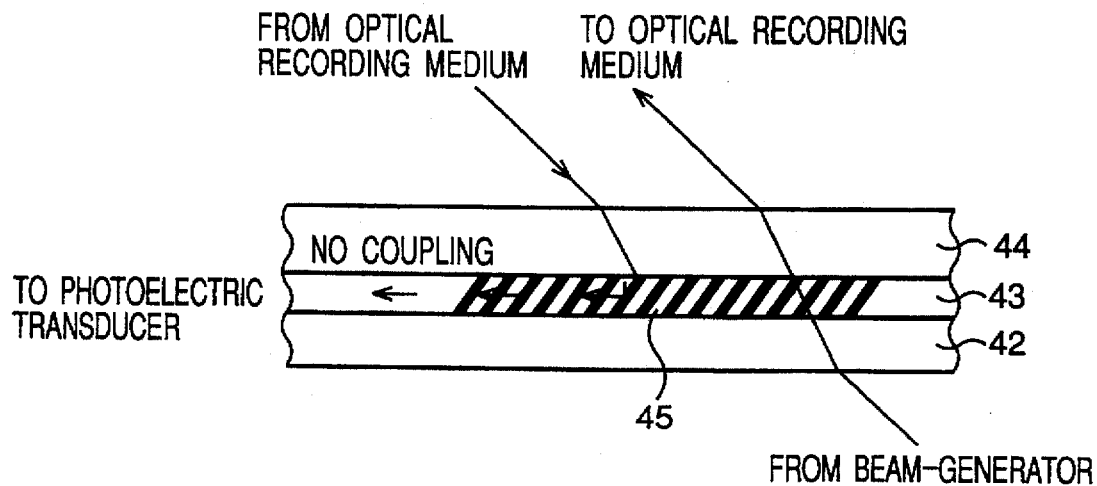
FIGS. 8A, 8B, 8C and 8D are views for describing the beam input to and output from an input coupler in an optical head according to the invention.
Figure 8B:
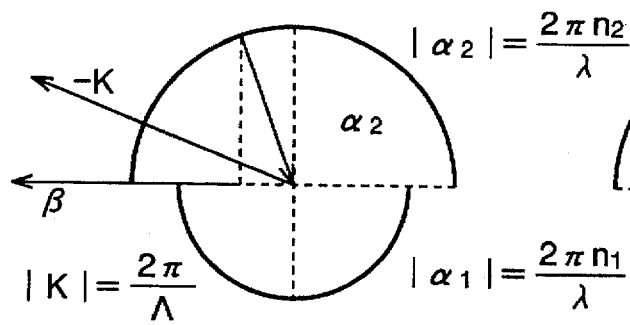
Figure 8C:
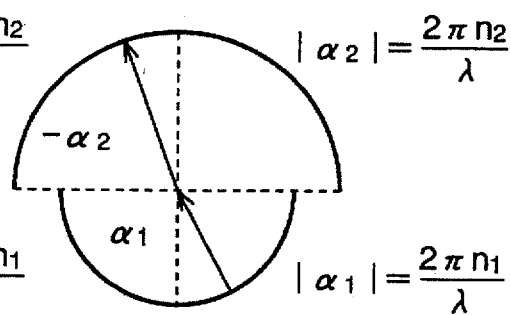
Figure 8D:
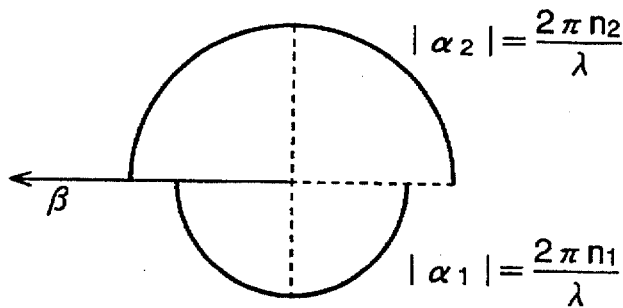
Figure 9A:
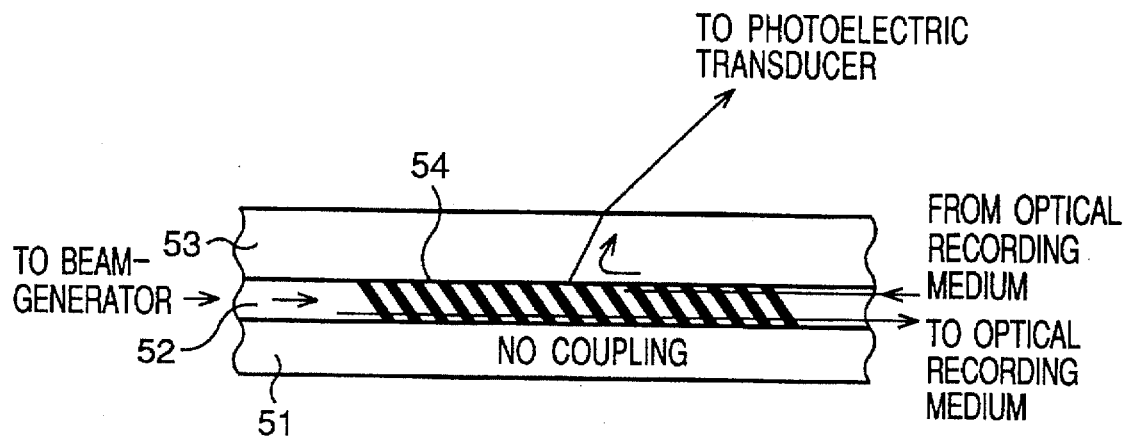
FIGS. 9A, 9B and 9C are views for describing the beam input to and output from an output coupler in an optical head according to the invention.
Figure 9B:
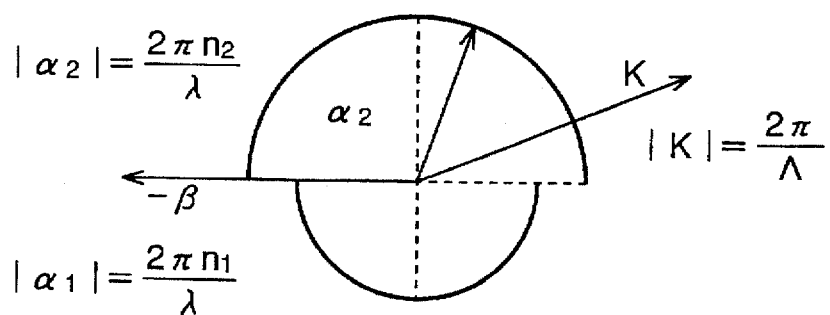
Figure 9C:
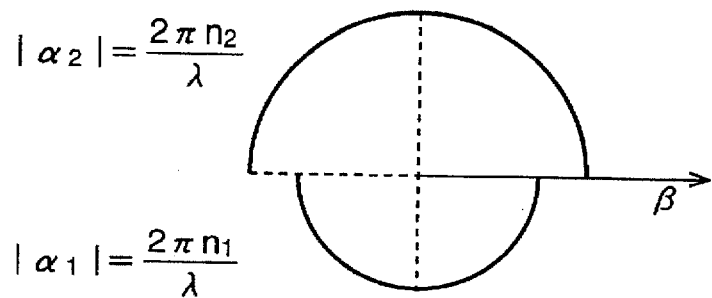

A third embodiment of the invention will now be described. FIGS. 7A to 7C schematically show the optical head according to the third embodiment of the invention. FIG. 7A is a sectional view showing the optical head. FIG. 7B is a plan view showing a photo-diode. FIG. 7C is a plan view showing a slab type waveguide. As shown in FIG. 7A, the embodiment essentially comprises a laser diode 31 as beam-generating means, a collimating lens 32, a slab type waveguide 33, an input hologram coupler 34, an output/input hologram coupler 35, an output hologram coupler 36, a Fresnel zone plate 37, and a photo-diode 38 for receiving and photoelectrically converting the reflected beam.

The input hologram coupler 34 is an input coupler formed as a slab type waveguide including a core 33a, an air layer 33d corresponding to a first cladding between a core 33a and the collimating lens 32, a core 33a corresponding to the core stated above, and a cladding 33b corresponding to a second cladding. The output hologram coupler 36 is an output coupler formed on the slab type waveguide.

The slab type waveguide 33 is fabricated in a process comprising a first step of photolithographically forming a photo-resist pattern on the upper surface of the cladding 33b, which is a synthetic quartz plate optically polished on both surfaces, a second step of forming the Fresnel zone plate 37 by dry etching, a third step of photolithographically forming a photo-resist pattern on the upper surface of the cladding 33b, depositing titanium, platinum and gold and lift-off forming interconnects 33c, a fourth step of forming the core 33a by depositing charcogenide on the bottom surface of the cladding 33b, and a fifth step of forming the input hologram coupler 34, output/input hologram coupler 35 and output hologram coupler 36 by obtaining an interference fringe with a computer and writing it by an electron beam on the core 33a.

The optical head of the third embodiment using the slab type waveguide 33 is fabricated by bonding electrodes 38e of the photo-diode 38 as shown in FIG. 7B and the interconnects 33c to one another with a conductive adhesive 39, bonding the interconnects 33c and a flexible substrate 40 with a conductive adhesive 39, and assembling together the laser diode 31 and the collimating lens 32. Since the slab type waveguide 33 has the interconnects 33c with the electrodes directly bonded thereto, it is possible to realize highly accurate positioning of the slab type waveguide 33 and the photo-diode 38 relative to each other.

As shown in the plan view of FIG. 7C, on the core 33a of the slab type waveguide 33 are formed the input hologram coupler 34, the output/input hologram coupler 35 and regions 36a and 36b of the output hologram coupler 36 between the input and output/input hologram couplers 34 and 35. The photo-diode 38, as shown in the plan view of FIG. 7B, has a two-division beam-receiving section constituted by photoelectric transducers 38a and 38b, a two-division beam-receiving section constituted by photoelectric transducers 38c and 38d, and electrodes 38e.

The operation of the optical head of the embodiment will now be described. Referring to FIG. 7A, the beam emitted from the laser diode 31 is collimated by the collimating lens 32 to be coupled to the core 33a in the input hologram coupler 34. The input hologram coupler 34 is such that an interference fringe generated on the core 33a by the collimated beam propagated in the +y direction. (i.e., upward in FIG. 7A) and the beam guided through the core 33a in the +x direction (i.e., rightward in FIG. 7A), is recorded as a volume hologram on the core 33a. When the collimated beam propagated in the +y direction, the input hologram coupler 34 reproduces the beam guided through the core 33a in the +x direction.

The beam guided through the core 33a in the +x direction reaches the output hologram coupler 36. The output hologram coupler 36 allows the beam guided through the core 33a in the +x direction to be guided to the output/input hologram coupler 35. The output/input hologram coupler 35 is such that an interference fringe formed on the core 33a by the beam guided through the core 33a in the +x direction and the collimated beam propagated in the +y direction is recorded as a volume hologram on the core 33a. When the beam guided through the core 33a in the +x direction is incident, the output/input hologram coupler 35 reproduces the collimated beam propagated in the +y direction, and when the collimated beam guided in the −y direction is incident, the output/input hologram coupler 35 reproduces the beam guided through the core 33a in the −x direction.

The beam emitted from the laser diode 31 and guided through the core 33a in the +x direction, is thus decoupled by the output/input hologram coupler 35 and transmitted through the cladding 33b as collimated beam propagated in the +y direction, thus being converged through the Fresnel zone plate 37 on the optical disk 8 for reflection therefrom.

The beam reflected from the optical disk 8 travels through the beam incidence path reversely in the order of the Fresnel zone plate 37, clad 33b, core 33a and output/input hologram coupler 35. The output hologram coupler 36, as shown in FIG. 7C, has regions 36a and 36b.

The region 36a is such that an interference fringe generated on the core 33a by the beam guided through the core 33a in the −x direction and the beam focused on the centers of the photoelectric transducers 38a and 38b of the photodiode 38 as shown in FIG. 7B, is recorded as a volume hologram on the core 33a. When the beam guided through the core 33a in the −x direction is incident, the region 36a reproduces the beam focused on the centers of the photoelectric transducers 38a and 38b.

The other region 36b is such that an interference fringe generated on the core 33a by the beam guided through the core 33a in the −x direction and the beam focused on the centers of the photoelectric transducers 38c and 38d, is recorded as a volume hologram on the core 33a. When the beam guided through the core 33a in the −x direction is incident, the region 36b reproduces the beam focused on the centers of the photoelectric transducers 38c and 38d.

The beam reflected from the optical disk 8 is thus decoupled from the core 33a in the regions 36a and 36b of the output hologram coupler 36 to be transmitted through the clad 33b and received in the photoelectric transducers 38a and 38b and also photoelectric transducers 38c and 38d of the photo-diode 38. The electric signal obtained through the photoelectric conversion in the photo-diode 38 is coupled through the flexible substrate 40 to an electric circuit (not shown).

The photo-diode 38 is provided such that, when the optical disk 8 is on the focal point of the Fresnel zone plate 37, the beam reflected by the optical disk 8 is focused on the line of division between the photoelectric transducers 38a and 38b and also on the line of division between the photoelectric transducers 38c and 38d. Thus, denoting the electric signals obtained through the photoelectric conversion in the photoelectric transducers 38a to 38d by S38a to S38d, the focus error signal is given as (S38a−S38b−S38c+S38d), and the track error signal is given as (S38a +S38b−S38c−S38d).

In this embodiment, the output hologram coupler 36 is such that, since the refractive index of the clad 33b is different from that of air, even if the beam is guided through the core 33a in the +x direction, no beam scattered from the center of the photoelectric transducers 38a and 38b or the center of the photoelectric transducers 38c and 38d is produced. In addition, since the output hologram coupler 36 is such that the volume hologram is recorded, the beam guided through the core 33a in the +x direction does not leak to the side of the clad 33a, and the beam guided through the core 33a in the −x direction does not leak to the air side. It is thus possible to increase the beam utilization efficiency and reduce noise.

While some preferred embodiments have been described, they are by no means limited thereto. For example, instead of using the input hologram coupler 34 shown in FIG. 7A, the beam emitted from the laser diode 31 may be directly coupled to the core 33a, and instead of using the output/input hologram coupler 35 and Fresnel zone plate 37, the beam guided through the core 33a may be converged by a condenser lens on the optical disk 8.

As has been described in the foregoing, according to the invention the two-dimensional data contained in the beam reflected by the optical recording medium can be compressed for each data to uni-dimensional data, and the beam coupling efficiency distribution can be optimized. It is thus possible to prevent mixing of the focus error signal and the track error signal as well as improving the beam utilization efficiency and reducing noise.

In addition, the slab type waveguide can include interconnects directly connected to the electrodes of the photoelectric transducer means, so that it is possible to provide freedom in the fitting of a photoelectric transducer section and reduce the thickness of the optical head. Moreover, it is possible to prevent the beam propagated through the core of the slab type waveguide from being coupled to the first clad side and/or the second clad side. The beam utilization efficiency thus can be greatly improved compared to the prior art with almost no generation of stray beam.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An optical head comprising:
    a beam-generating means;
    a slab type waveguide including a cladding, a first core and a second core, said first and second cores being formed on opposite side surfaces of said cladding;
    an output coupler provided on said slab type waveguide for decoupling a beam emitted from said beam-generating means and waveguided through said second core;
    a lens for focusing onto an optical recording medium a beam decoupled in said output coupler and transmitted through said cladding and said first core;
    an input coupler provided on said slab type waveguide for coupling to said first core a beam reflected from said optical recording medium and led to said lens, the beam coupled to said first core by said input coupler being waveguided through said first core; and a photoelectric transducer means for detecting the beam coupled to said input coupler and waveguided through said first core.

2. An optical head comprising:

a beam-generating means;

a slab type waveguide including a first cladding, a second cladding, and a core interposed between said first cladding and said second cladding;

a lens for focusing onto an optical recording medium a beam emitted from said beam-generating means and transmitted through said slab type waveguide in the order of said first cladding, said core and said second cladding;

an input coupler provided on said slab type waveguide for coupling to said core a beam reflected from said optical recording medium and led to said lens, said input coupler serving as a volume hologram having a grating vector K simultaneously satisfying relations $$K \neq -\alpha_1 - \beta$$

and $$K = \alpha_2 - \beta$$

where $\alpha_1$ is the wave vector of the beam emitted from said beam-generating means and transmitted through said first cladding, $\alpha_2$ is the wave vector reflected from said optical recording medium and transmitted through said second cladding, and $\beta$ is the propagation constant vector of the beam guided through said core; and a photoelectric-transducer means for detecting a beam coupled to said input coupler and guided through said core.

3. An optical head comprising:

a beam-generating means;

a slab type waveguide including a first cladding, a second cladding, and a core interposed between said first cladding and said second cladding;

a lens for focusing on an optical recording medium a beam emitted from said beam-generating means and transmitted through said slab type waveguide in the order of said first cladding, said core and said second cladding;

an input coupler provided on said slab type waveguide for coupling to said core a beam reflected from said optical recording medium and led to said lens;

an output coupler provided on said slab type waveguide for decoupling a beam coupled to said input coupler and waveguided through said core;

a photoelectric transducer means for detecting a beam decoupled by said output coupler; and interconnects provided on said slab type waveguide and flip-chip-bonded to said photoelectric transducer means.

4. An optical head comprising:

a beam-generating means;

a slab type waveguide including a first cladding, a second cladding, and a core interposed between said first cladding and said second cladding;

a lens for focusing a beam emitted from said beam-generating means and guided through said core onto an optical recording medium;

an output coupler provided on said slab type waveguide for decoupling a beam reflected from said optical recording medium, led to said lens and guided through said core, said output coupler serving as a volume hologram having a grating vector K simultaneously satisfying relations $$K \neq -\alpha_1 - \beta$$

and $$K = \alpha_2 - \beta$$

where $\alpha_1$ is the wave vector of the beam decoupled from said core and transmitted through said first cladding, $\alpha_2$ is the wave vector of the beam decoupled from said core and transmitted through said second cladding, and $\beta$ is the propagation constant vector of the beam guided through said first core; and a photoelectric transducer means for detecting a beam decoupled by said output coupler.

5. The optical head according to claim 4, wherein said slab type waveguide has interconnects connected to said photoelectric transducer means.

6. The optical head according to claim 4, wherein said slab type waveguide has interconnects flip-chip-bonded to said photoelectric transducer means.

* * * * *